April 13, 1926.
F. SHANNON
1,580,924
WORKPIECE SUPPORTING ATTACHMENT FOR PRESSES
Filed May 18, 1925
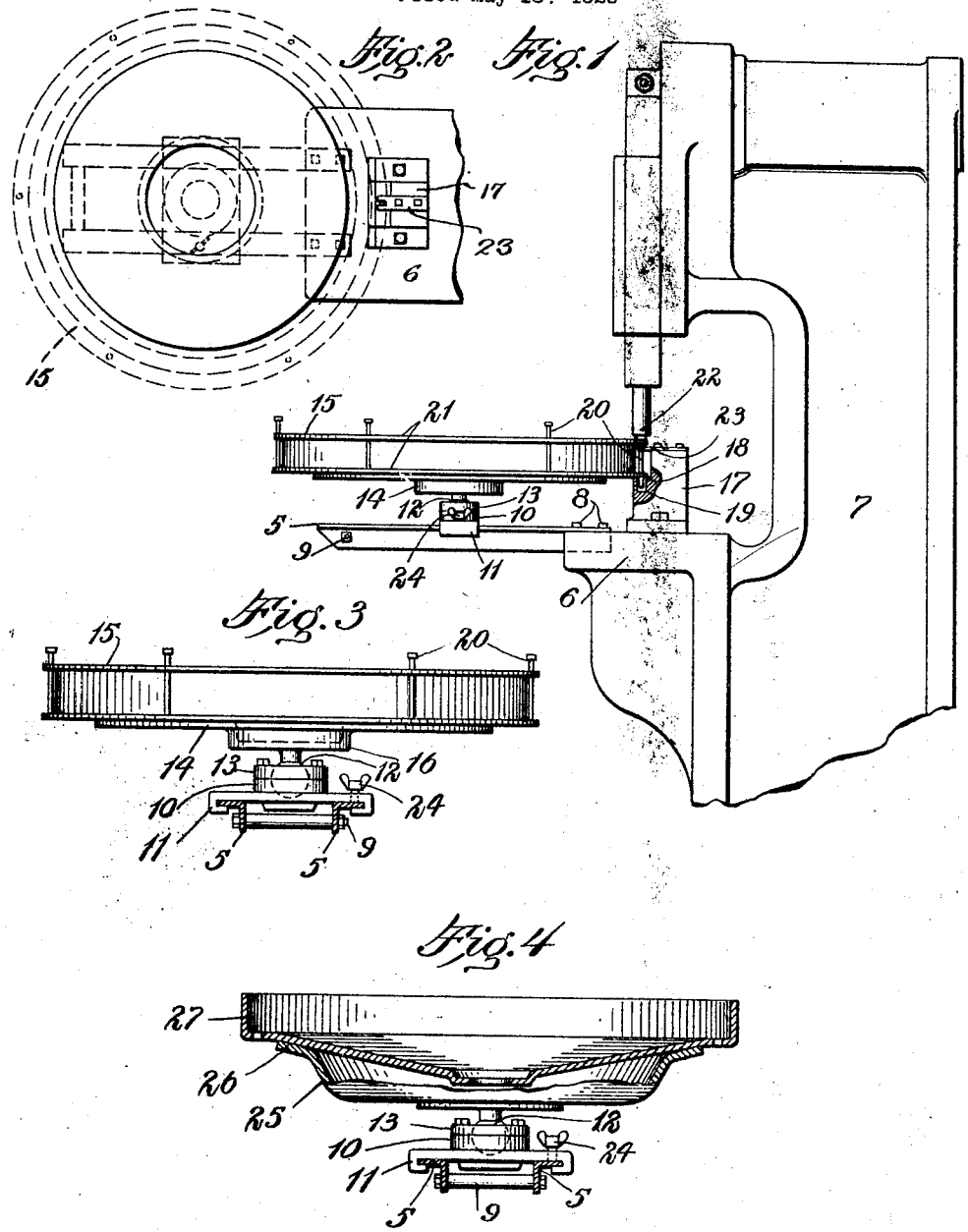
INVENTOR
Frank Shannon
BY
ATTORNEY Patented Apr. 13, 1926.

1,580,924

UNITED STATES PATENT OFFICE.

FRANK SHANNON, OF NORTH TARRYTOWN, NEW YORK.

WORK-PIECE-SUPPORTING ATTACHMENT FOR PRESSES.

Application filed May 18, 1925. Serial No. 31,253.

*To all whom it may concern:*

Be it known that I, FRANK SHANNON, a citizen of the United States, and residing at North Tarrytown, in the county of Westchester and State of New York, have invented certain new and useful Improvements in Work-Piece-Supporting Attachments for Presses, of which the following is a specification, such as will enable those skilled in the art to which it appertains to make and use the same.

This invention relates to presses and like apparatus and particularly to the provision of a workpiece supporting attachment adapted to be mounted in connection with the bed plate of the press for supporting a workpiece in connection therewith; and the object of the invention is to provide an attachment of the class specified, which is designed particularly in supporting motor vehicle wheels and similar annular bodies or devices in connection with a press and to provide means for universally supporting the workpiece in connection with said attachment to permit the movement thereof into several positions in the press; a further object being to provide means for adjusting a part of the attachment to adapt the same for use in connection with workpieces of different sizes; and with these and other objects in view, the invention consists in a device of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic side view of a part of a press illustrating my attachment mounted in connection therewith and indicating the method of its use;

Fig. 2 is a plan view of a part of the construction shown in Fig. 1 indicating a workpiece in dotted lines;

Fig. 3 is a front view of a part of the construction shown in Fig. 1; and

Fig. 4 is a view similar to Fig. 3 but showing a modification.

In the manufacture of motor vehicle wheels and similar wheel-like or annular bodies and especially in the mounting of bolts, screws, rivets, and the like in connection with the periphery portion of said bodies, as for example, the passing of bolts through the rim portion of a wheel, it has been customary, in the accomplishment of this operation on power presses, for the operator to place that edge portion of the wheel through which the bolt is to be passed on a die block and to support the remainder of the wheel by hand; and in the present method of procedure, it is also customary to shift the wheel or the periphery portion thereof into different positions on the die block in the mounting of a plurality of bolts in connection therewith, and this operation becomes very tiring to the operator, resulting in a slow production of wheels and especially in the mounting of bolts in connection therewith.

The object of my invention is to provide an attachment adapted to be mounted in connection with the bed of the press and provided with means for supporting the wheel or other workpiece, and in carrying my invention into effect, I provide two angle-iron rails 5 mounted in spacing relation and secured to the bed-plate 6 of the press 7 as seen at 8, and the outer ends of which are coupled together by a spaced rod and bolt construction 9. Slidably mounted upon the rails 5 is a block 10, the side portions of which are hook-shaped in form as shown at 11 to engage the flanges of the rails 5; and the block 10 is provided centrally with a socket to receive a ball-shaped bearing 12 held in position in the block 10 by a removable plate 13, and the bearing 12 is capable of oscillatory movement in the block 10 and rotation therein as will be apparent, and said bearing carries a workpiece supporting plate 14 upon which a wheel or other workpiece 15 is adapted to be placed and centered on the support 14 by a cup-shaped part 16 in connection with which the hub portion of the wheel operates, as seen in Figs. 1 to 3 inclusive.

Mounted on the bed plate 6 of the press is a die block 17 having a shoulder portion 18 upon which the periphery of the wheel 15 is adapted to rest, and said shoulder is apertured as seen as 19 to permit the passage of the bolts 20 through both flanges 21 at the periphery of the wheel. The die block 17 is positioned beneath the plunger 22 of the press, and a projecting fork-shaped finger 23 is mounted on top of the die block 17 and is adapted to encircle or partially encircle the bolts 20 beneath the uppermost flange of the wheel and upon which said flange rests. This finger serves to reinforce that portion of the upper flange of the wheel through which the bolt passes in driving the bolt into position.

In the construction shown, the bolts 20 are pressed or driven into position in what is known as a pressed or drive fit, and the bolts are located about the periphery of the wheel at spaced intervals, six of which are indicated in the construction shown, and said bolts extend through the flanges of the wheel as will be apparent. It will be understood that in using workpieces of a given size or in passing bolts through wheels of the same size on one press, the block 10 is fixed in predetermined position by the set-screw 24 and the wheels 15 are placed by hand upon the support 14 after the bolts 20 have been set in position, with the head end portions thereof projecting as seen at the left of Fig. 1; and after the wheel has been mounted on the support 14, the same is rotated to bring one of the bolts in proper alinement on the die block 17 and the press is tripped in the usual manner, and the descending plunger 22 operates to drive the bolt into proper position as seen at the right of Fig. 1, the free end of the bolt extending into the aperture 19 in this operation, and after the plunger has raised, the front end portion of the wheel is moved downwardly to tilt the rear end thereof upwardly to move the bolt 20 out of engagement with the aperture 19. The wheel is then rotated on the bearing 12 to bring the next bolt 20 into proper position on the die block 17. This operation is continued until all of the bolts have been set into proper position on the wheel. The wheel is then removed from the support 14 and another wheel placed thereon. It will be understood that the entire weight of the wheel is supported by the block 10 and the rails 5 and the operator is relieved of the burden of supporting the wheel, and in this way the operation of driving bolts or other devices into position is facilitated.

In Fig. 4, I have shown a slight modification in the supporting means for the wheel, in which figure the bearing 12 is provided with a cup-shaped support 25 having an upwardly and outwardly extending flange 26 upon which a disk-shaped wheel 27 is adapted to seat. It will be understood that the operation or use of the support as seen in Fig. 4 will be the same as that shown in Figs. 1 to 3 inclusive, and it will be also apparent that my invention is not necessarily limited to any specific shape or form of supporting plate, nor to the supporting of motor vehicle wheels in connection with a press or other apparatus; and various other changes in and modifications of the construction herein shown and described may be made within the scope of the appended claims without departing from the spirit of my invention or sacrificing its advantages.

Having fully described my invention, what I claim as new and desire to secure by Letters Patent is:—

1. A workpiece support for presses and like apparatus, comprising a block, means for adjustably mounting the block in connection with the apparatus, a member movably mounted in and with said block and in connection with which a workpiece is adapted to be supported, and the mounting of said member in connection with said block being universal.

2. A workpiece support for presses employing a bed plate and plunger, comprising a block, means for adjustably mounting the block in connection with the bed plate of the apparatus, a die on said bed plate, a member rotatably mounted in said block and adapted to support a workpiece in position to rest upon said die beneath the plunger of the press.

3. A workpiece support for presses employing a bed plate and plunger, comprising a block, means for adjustably mounting the block in connection with the bed plate of the apparatus, a die on said bed plate, a member rotatably mounted in said block and adapted to support a workpiece in position to rest upon said die beneath the plunger of the press, and the mounting of said member in connection with said block also permitting of oscillatory movement of the workpiece on said block.

4. The combination with a press having a bed plate, of a workpiece supporting attachment comprising two spaced guide rails mounted in connection with the bed plate of the press, a block slidably engaging said rails, and a workpiece supporting member universally mounted in said block.

5. The combination with a press having a bed plate, of a workpiece supporting attachment comprising two spaced guide rails mounted in connection with the bed plate of the press, a block slidably engaging said rails, a workpiece supporting member universally mounted in said block, and means for retaining said block in different positions of adjustment.

6. A workpiece supporting attachment for apparatus of the class specified, comprising two guide rails adapted to be mounted in connection with the apparatus in spaced relation, a block slidably engaging said rails, and a workpiece supporting member movably mounted in connection with said block.

7. A workpiece supporting attachment for apparatus of the class specified, comprising two guide rails adapted to be mounted in connection with the apparatus in spaced relation, a block slidably engaging said rails, and a workpiece supporting member movably mounted in connection with said block, said member being capable of rotary and oscillatory movement in said block.

8. A workpiece supporting attachment for apparatus of the class specified, comprising two guide rails adapted to be mounted in connection with the apparatus in spaced relation, a block slidably engaging said rails, a workpiece supporting member movably mounted in connection with said block, said member being capable of rotary and oscillatory movement in said block, and means for retaining said block in predetermined positions of adjustment on said rails.

In testimony that I claim the foregoing as my invention I have signed my name this 14th day of May, 1925.

FRANK SHANNON.